United States Patent
Hamada et al.

(10) Patent No.: US 6,311,725 B1
(45) Date of Patent: Nov. 6, 2001

(54) FUEL SUPPLY APPARATUS

(75) Inventors: Mikio Hamada; Satomi Wada, both of Handa; Nobuo Suzuki, Obu; Tadao Horiuchi, Toyoake, all of (JP)

(73) Assignee: Aisan Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/570,933

(22) Filed: May 15, 2000

(30) Foreign Application Priority Data

May 25, 1999 (JP) .................................................. 11-144434

(51) Int. Cl.[7] ..................................................... F02M 37/04
(52) U.S. Cl. ...................... 137/565.13; 123/509; 137/549
(58) Field of Search ..................................... 123/509, 514, 123/516; 137/565.13, 549

(56) References Cited

U.S. PATENT DOCUMENTS 5,649,514 * 7/1997 Okada et al. ......................... 123/514
5,718,208 * 2/1998 Brautigan et al. .................... 123/516
5,960,775 * 10/1999 Tuckey .................................. 123/509

FOREIGN PATENT DOCUMENTS

A-9-42097 2/1997 (JP) .

* cited by examiner

Primary Examiner—A. Michael Chambers
(74) Attorney, Agent, or Firm—Oliff & Berridge, PLC

(57) ABSTRACT

A fuel supply apparatus for engines of a multi-point injection system using fuel tanks of many sizes and shapes is disclosed. In the fuel supply apparatus, a pump device 10 is constructed of an electric motor-driven fuel pump 10, a fuel filter 49, and a pressure regulator 21, which are contained in a housing integrally constructed of a first and second cases 11 and 12. A suction port 15 of the pump device 10 communicates with a suction opening 24 of the fuel pump 19, while a discharge outlet portion 26 of the pump device 10 communicates with a discharge port 17 through the fuel filter 49. The discharge port 17 communicates with an inlet of the pressure regulator 21. An outlet of the pressure regulator 21 communicates with a return port 16 of the pump device 10.

13 Claims, 4 Drawing Sheets

FUEL SUPPLY APPARATUS

BACKGROUND OF THE INVENTION

1. Field of the Invention

The present invention relates to a fuel supply apparatus for supplying fuel to engines of a multi-point injection system using various types of fuel tanks.

2. Description of Related Art

Fuel tanks used for engines of a multi-point injection system (MPI) are of many shapes and sizes. However, some of such the tanks could not incorporate therein a fuel pump of an in-tank type. Thus, there has been proposed an apparatus in which a fuel pump of an in-line type is provided in piping installed between a fuel tank and a delivery pipe (a fuel distribution pipe), and a pressure regulator is disposed between the delivery pipe and the fuel tank. One example of such the apparatus is disclosed in Japanese patent unexamined publication No. Hei 9-42097. In this apparatus, a fuel pump can be disposed in an appropriate manner for various fuel tanks. However, a filter, the fuel pump, and the pressure regulator should be connected independently with different pipes, requiring a number of labors for assembling them, and also needing individual countermeasures against leakage, which results in an increased cost.

SUMMARY OF THE INVENTION

The present invention has been made in view of the above circumstances and has an object to overcome the above problems and to provide a fuel supply apparatus suitable for engines of a multi-point injection system using fuel tanks of various types, in which a fuel pump (especially, a high-pressure fuel pump), a fuel filter, and a pressure regulator are integrally constructed as an integral unit.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a fuel supply apparatus for supplying fuel from a fuel tank to an engine by using a fuel pump, the apparatus including a pump device including: a fuel pump; a fuel filter; a pressure regulator; a housing for containing the fuel pump, the fuel filter, and the pressure regulator; the housing including a suction port and a return port, each connected to the fuel tank; a discharge port connected to the engine; a suction opening communication path for communicating the suction port to a suction opening of the fuel pump; a filter communication path for communicating a discharge outlet portion of the fuel pump to an entrance of the fuel filter; a discharge communication path for communicating an exit of the fuel filter to the discharge port; and a pressure regulator communication path for communicating the exit of the fuel filter to the pressure regulator.

In the fuel supply apparatus according to the present invention, the electric motor-driven fuel pump (in particular, a high-pressure fuel pump), the fuel filter, the pressure regulator are contained in the integrally constructed housing, thus forming an integral pump device. The suction port of the pump device communicates with the suction opening of the fuel pump. The discharge outlet portion of the pump communicates with the discharge port of the pump device through the fuel filter. The discharge port of the pump device communicates with the inlet of the pressure regulator. The outlet of the pressure regulator communicates with the return port of the pump device. Accordingly, the installation of the apparatus in automobiles needs no labors or troubles of connecting the electric motor-driven fuel pump, the fuel filter, and the pressure regulator with pipes. There is no need to individually provide leakage-preventing measures to the fuel pump, the fuel filter, and the pressure regulator. Thus, the fuel supply apparatus according to the present invention can achieve cost-reduction.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1:
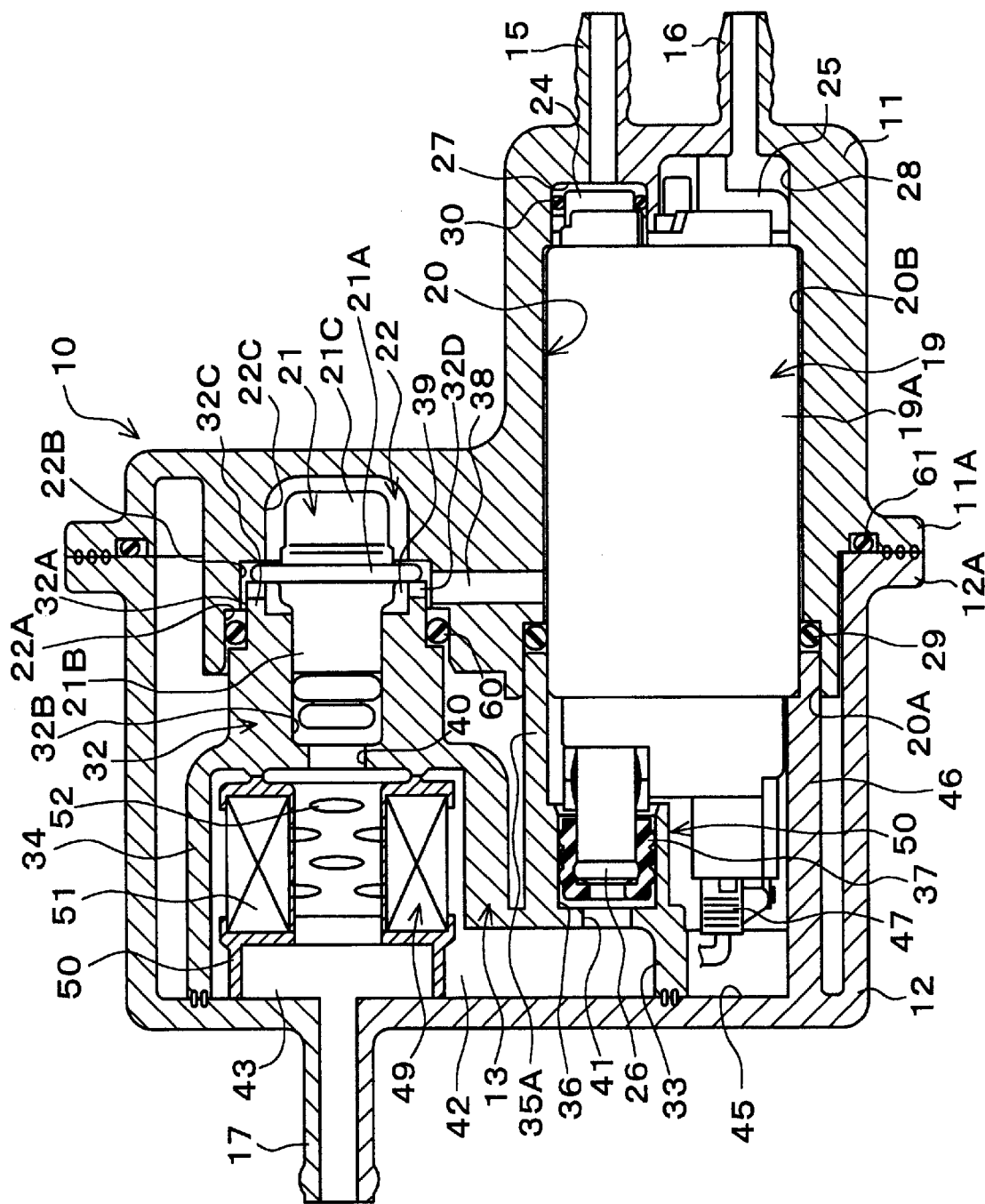
FIG. 1 is a partial sectional view of a pump device in a first embodiment according to the present invention.

A detailed description of a first preferred embodiment of a fuel supply apparatus embodying the present invention will now be given referring to the accompanying drawings. FIG. 1 is a partial sectional view of a fuel pump device 10 in the fuel supply apparatus in the first embodiment.

As shown in FIG. 1, the pump device 10 is provided with a first and second cases 11 and 12 made of synthetic resin or metal and connected to constitute an integral housing of the device. This housing is sealed. Specifically, the first case 11 is integrally formed with a suction port 15 and a return port 6, both of which protrude from an end surface of the case 11. The second case 12 is integrally formed with a discharge port 17 protruding from an end surface of the case 12. In the first case 11 are formed a pump mounting cavity 20 opening in an interior end (that is, the end facing the second case 12) for holding therein an electric motor-driven fuel pump 19 and a recessed portion 22 opening in the interior end for holding there in a pressure regulator 21. The pressure regulator 21, which is a valve for regulating pressure of fluid, serves to regulate the pressure of fuel to be injected from an injector of an engine at a constant value.

The pump mounting cavity 20 is substantially a hole of circular cross-section. This hole 20 includes a large-diameter hole section 20A formed in the open end side and a medium-diameter hole section 20B formed adjacent to the hole section 20A. The medium-diameter hole section 20B includes, in its bottom (in the right end in FIG. 1), a recessed portion 27 for receiving a suction opening (mentioned later) and a recess 28 for receiving a vapor discharge opening (mentioned later). The electric motor-driven fuel pump 19 is mounted in the pump mounting hole 20 so that an end (a right end in FIG. 1) of a large-diameter portion 19A of the pump 19 contacts with a part of an end surface of the medium-diameter hole section 20B (a lower end portion in FIG. 1). An O-ring 29 is arranged on the periphery of the large-diameter portion 19A of the pump 19 in the other end (a left end in FIG. 1) side. The large-diameter portion 19A of the pump 19 is thus supported by the O-ring 29 brought into contact with the large-diameter hole section 20A. This O-ring 29 provides a seal between the large-diameter hole section 20A and the large-diameter portion 19A.

The electric motor-driven fuel pump 19 has a suction opening 24 in a protruding manner. This suction opening 24 is disposed in the recessed portion 27 of the pump mounting hole 20 with an O-ring 30 arranged between the periphery of the suction opening 24 and the recessed portion 27. This O-ring 30 is mounted on the periphery of the suction opening 24 and in close contact with the recessed portion 27 in order to provide a seal between the periphery of the suction opening 24 and the recessed portion 27. The suction opening 24 communicates with the suction port 15 through the recessed portion 27 which serves as a communication path. The pump 19 also has a vapor discharge opening 25 disposed in the recessed portion 28 of the pump mounting hole 20. This vapor opening 25 communicates with the return port 16 through the recessed portion 28. There is provided a clearance between the medium-diameter hole section 20B of the pump mounting hole 20 and the large-diameter portion 19A of the pump 19. This clearance communicates with the recessed portion 28 which receives the vapor discharge opening 25.

The recessed portion 22 for holding the pressure regulator 21 is a stepped hole of circular section, which is configured such that a large-diameter hole section 22A, a medium-diameter hole section 22B, and a small-diameter hole section 22C are continuously formed. The pressure regulator 21 is disposed with a flange 21A thereof brought into contact with a shoulder formed between the medium-diameter hole section 22B and the small-diameter hole section 22C, with a large-diameter portion 21C inserted in the small-diameter hole section 22C, and with a small-diameter portion 21B disposed in the medium-diameter hole section 22B and the large-diameter hole section 22A. A holder 13 arranged inside the second case 12 is constructed of a ring-shaped base portion 33, a cup-shaped portion 34, a stepped protruding portion 32, and a small protruding portion 35. The stepped protruding portion 32 is formed protruding from the bottom of the cup-shaped portion 34 so that both of the portions 32 and 34 are arranged in parallel with the small protruding portion 35. The ring-shaped stepped protruding portion 32 is partially inserted in the large-diameter hole section 22A and the medium-diameter hole section 22B of the recessed portion 22. Between the periphery of a small-diameter portion 32A of the stepped protruding portion 32 and the large-diameter hole section 22A of the recessed portion 22, an O-ring 60 is mounted for supporting the small-diameter portion 32A of the protruding portion 32, thereby providing a seal between the small-diameter portion 32A and the large-diameter hole section 22A.

The stepped protruding portion 32 is formed with an engagement hole 32B in which the small-diameter portion 21B of the pressure regulator 21 is engaged so that the interior of the engagement hole 32B and the exterior of the small-diameter portion 21B are kept in close contact with each other. At an end (a right end in FIG. 1) of the stepped protruding portion 32, formed is a ring-shaped protruding portion 32C which presses, by its end surface, the flange 21A of the pressure regulator 21 against the shoulder formed between the medium-diameter hole section 22B and the small-diameter hole section 22C. An annular space 39 is provided between the interior of the protruding portion 32C and the exterior of the pressure regulator 21. An unillustrated outlet of the pressure regulator 21 faces the space 39. A plurality of communication slots 32D are formed radially extending in the end of the ring-shaped protruding portion 32C which is in contact with the flange 21A.

A communication hole 38 is formed in the first case 11, extending to communicate the medium-diameter hole section 22B of the recessed portion 22 with the medium-diameter hole section 20B of the pump mounting hole 20. The outlet of the pressure regulator 21 communicates with the clearance between the medium-diameter hole section 20B of the pump mounting hole 20 and the large-diameter portion 19A of the electric motor-driven fuel pump 19 by way of the space 39, the communication slots 32D of the protruding portion 32C, the medium-diameter hole section 22B, and the communication hole 38.

In the holder 13, the cup-shaped portion 34 is formed between the ring-shaped base portion 33 and the stepped protruding portion 32. The ring-shaped small protruding portion 35 is arranged in parallel with the cut-shaped portion 34. The small protruding portion 35 is formed with a semi-circularly curved protruding portion 35A which is partially inserted between the large-diameter hole section 20A of the pump mounting hole 20 and the large-diameter portion 19A of the fuel pump 19. The small protruding portion 35 also has a hollowed portion 36 for receiving a discharge outlet portion 26 formed protruding from the pump 19. A cup-shaped support member 37 is mounted between the discharge outlet portion 26 and the hollowed portion 36. The opening of this discharge outlet portion 26 communicates with a space 42 (provided between an inner bottom surface 45 of the second case 12 and the holder 13) through a communication hole of the support member 37 and a communication hole 41 of the holder 13.

The first case 11 is connected with the substantially cup-shaped second case 12 with the flange 11A brought into contact with the flange 12A. An O-ring 61 is mounted in an annular groove formed in a contact face of the flange 11A which contacts with a corresponding contact face of the flange 12A. The flanges 11A and 12A are connected by welding, adhering, or bolts and nuts, with the O-ring 61 abutting against the contact face of the flange 12A. Thus, the O-ring 61 provides a sealing relationship between the flanges 11A and 12A. The end of the ring-shaped base portion 33 of the holder 13 is kept in contact with the inner bottom surface 45 of the second case 12 and is joined therewith by welding or adhering. In the second case 12, a semi-circularly curved protruding portion 46 is perpendicularly formed on the bottom surface 45 so that an end of the protruding portion 46 is inserted between the large-diameter hole section 20A of the pump mounting hole 20 and the large-diameter portion 19A of the fuel pump 19. The fuel pump 19 is further provided with an intermediate terminal 47 disposed in a space provided between the semi-circularly curved protruding portion 46 and the small protruding portion 35.

A ring-shaped supporting member 50 of a fuel filter 49 for high-pressure fuel is disposed inside the cup-shaped portion 34 of the holder 13. The supporting member 50 is formed with a plurality of through holes 52 in the inner peripheral wall of a filter mounting part and is provided with a cylindrical filter member 51 set in the filter mounting part. The outer peripheral surface of the filter member 51, which serves as an entrance of the fuel filter 49, communicates with the discharge outlet portion 26 through the space 42 and the communication hole 41. The inner surface of the filter member 51, which serves as an exit of the fuel filter 49, communicates with the discharge port 17 through the through holes 52 of the supporting member 50 and the space 43 provided between the bottom surface 45 of the second case 2 and the supporting member 50. The through holes 52 of the supporting member 50 communicate with an inlet of the pressure regulator 21 through the communication hole 40 of the holder 13 and engagement hole 32B. The pump device 10 in the first embodiment is constructed as above.

Figure 3:
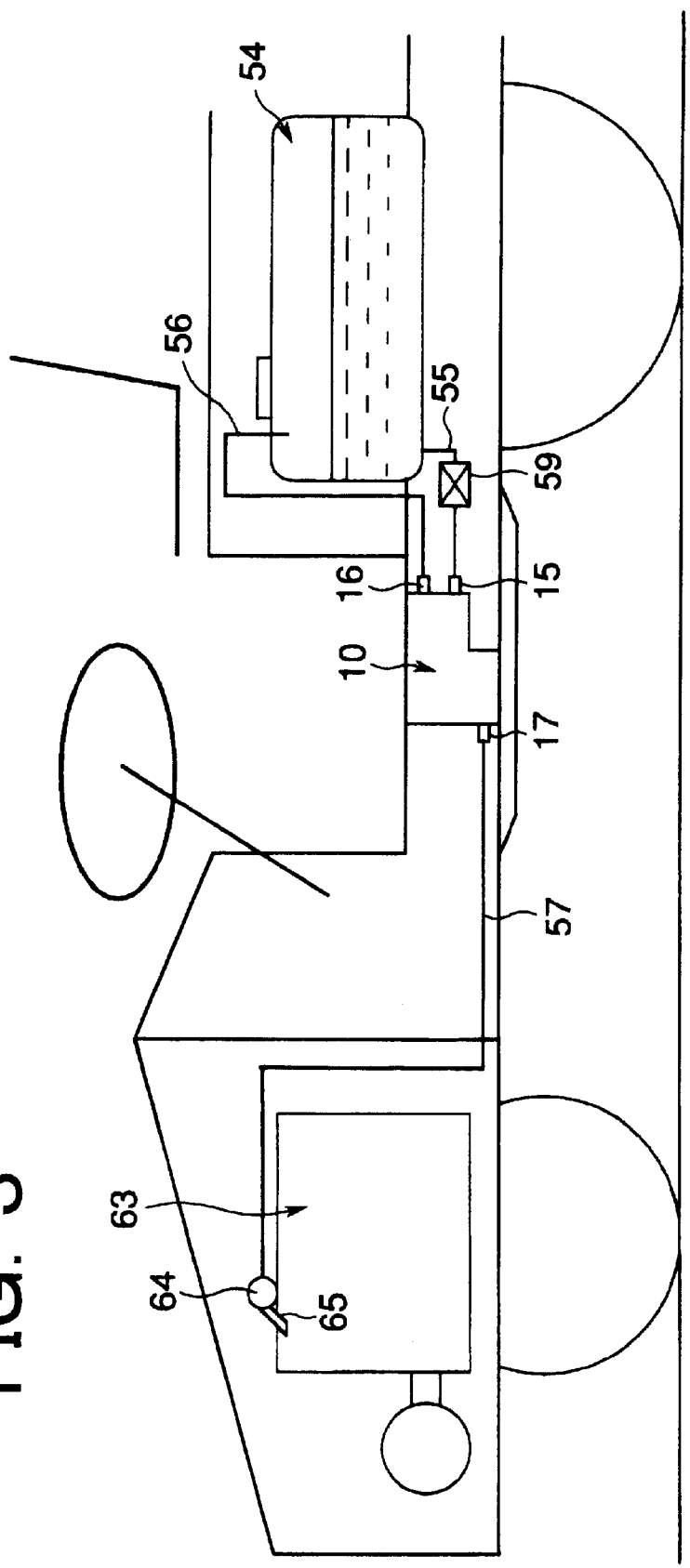
FIG. 3 is an explanatory view of a first example of application of the first or second embodiment of the present invention to an automobile.

FIG. 3 is a first exemplified state where the first or second embodiment according to the present invention is applied to an automobile.

A fuel tank 54 which is of a low height (for example, of a height in a range of 10–50 cm) is disposed in a relatively low position in the automobile so that the pump device 10 is arranged at almost the same height as the fuel tank 54. The suction port 15 of the pump device 10 is communicated with the fuel tank 54 through a suction pipe 55 extending downward from the bottom of the fuel tank 54. The inlet end of the suction pipe 55 is connected to the bottom of the fuel tank 54, while a fuel filter 59 for low-pressure fuel is arranged in the suction pipe 55. The discharge port 17 of the pump device 10 is communicated with a delivery pipe 64 of an engine 63 through a discharge pipe 57. The delivery pipe 64 is joined with a plurality of injectors 65. It is to be noted that, in the first example shown in FIG. 3, the electric motor-driven fuel pump 19 of the pump device 10 can be either of a displacement type or a non-displacement type.

With arrangements shown in FIGS. 1 and 3, upon actuation of the pump device 10, the fuel in the fuel tank 54 is sucked to the fuel pump 19 through the suction pipe 55, the low-pressure-fuel filter 59, the suction port 15 of the pump device 10, and the suction opening 24 of the pump 19. The fuel discharged from the pump 19 is supplied to the delivery pipe 64 by way of the discharge outlet portion 26 of the pump 19, the communication hole 41 of the holder 13, the space 42, the fuel filter 49, the space 43, the discharge port 17 of the pump device 10, and the discharge pipe 57 connected to the delivery pipe 64. Then, the fuel is injected from the injectors 65 joined with the delivery pipe 64 into the engine 63. Excess high-pressure fuel and fuel vapor are allowed to flow through the communication hole 40, the outlet of the pressure regulator 21, the communication hole 38, the clearance between the pump mounting hole 20 and the pump 19, the recessed portion 28, the return port 16, and a return pipe 56 connected with the return port 16. Thus, the fuel and vapor are returned to the fuel tank 54. Accordingly, the pressure of the fuel to be supplied to the engine 63 is regulated and maintained at a predetermined pressure by operation of the pressure regulator 21. On the other hand, excess low-pressure fuel is allowed to flow from the vapor discharge opening 25 of the pump 19 to the return port 16 via the recessed portion 28, and then is returned to the fuel tank 54 through the return pipe 56.

Figure 4:
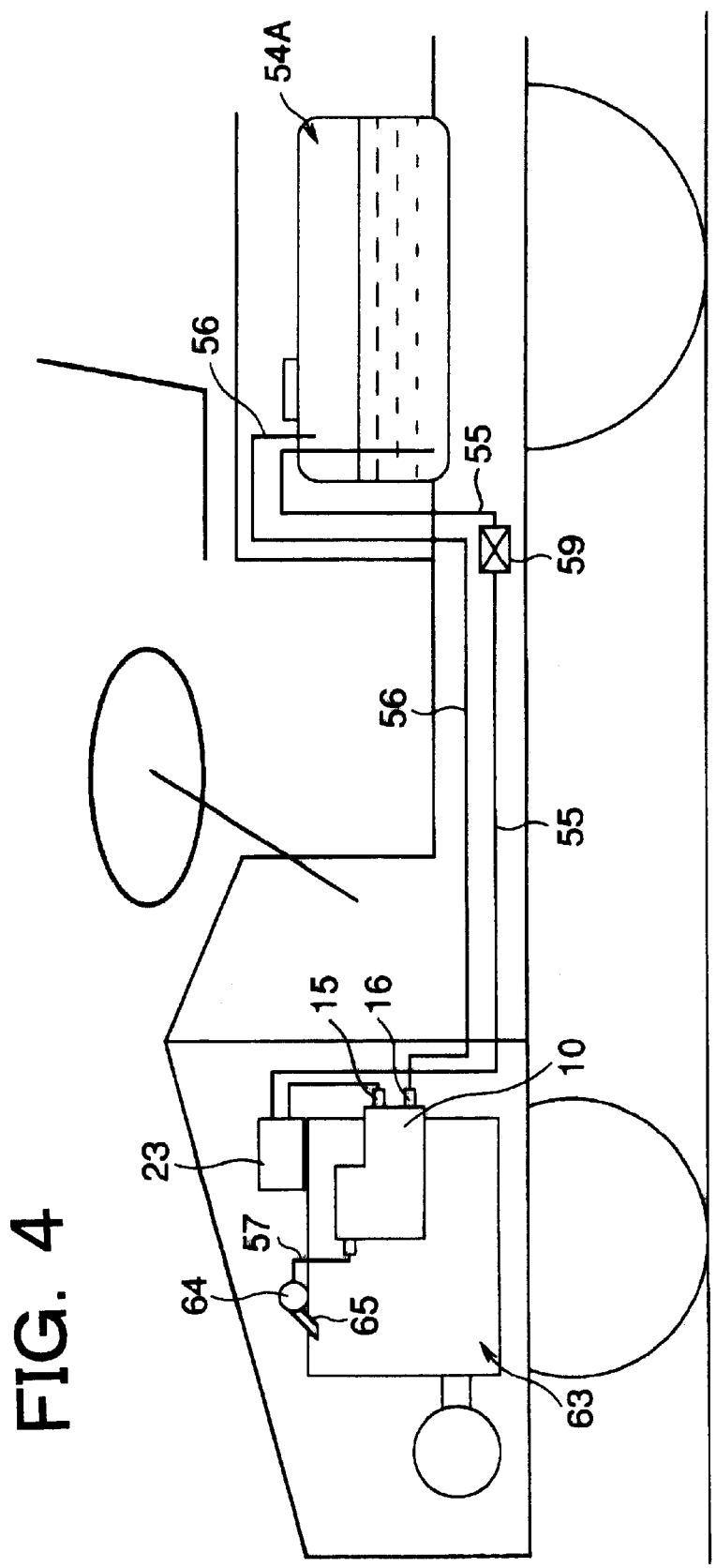
FIG. 4 is an explanatory view of a second example of application of the first or second embodiment of the present invention to an automobile.

FIG. 4 is a second exemplified state where the first or second embodiment according to the present invention is applied to an automobile. It is to be noted that like elements corresponding to those of FIGS. 1 and 3 are indicated by like numerals.

A fuel tank 54A of a low height is disposed in a relatively low position in the automobile. In this second example, a suction pipe 55 is arranged extending above the upper surface (or along the side surface) of the fuel tank 54, while an inlet end of the pipe 55 is open inside a fuel tank 54A, near the bottom thereof. In the suction pipe 55 are disposed the fuel filter 59 for low-pressure fuel and a fuel pump 23 for low-pressure fuel. The outlet end of the suction pipe 55 is connected to the suction port 15 of the pump device 10. In this state where the suction pipe 55 is partially arranged in a higher position than the pump device 10, the fuel pump 19 of a non-displacement type may not satisfactorily transfer the fuel from the tank 54A due to its insufficient sucking power. For covering the insufficient power, a fuel pump 23 for low-pressure fuel is used in combination with the fuel pump 19 so that the pump 19 of a non-displacement type which is of a low sucking power and a low cost can transfer the fuel from the tank 54A. If the pump 19 is a displacement type which is of a high sucking power, alternatively, such the fuel pump 23 for low-pressure fuel may be omitted.

In FIGS. 1 and 4, the fuel pump 23 for low-pressure fuel is attached to the engine 63 and will be driven by utilizing rotational power of a crank shaft of the engine 63 and variations in the pressure in a crankcase. Upon actuation of the low-pressure fuel pump 23 and the pump device 10, the fuel is sucked from the fuel tank 54A through the suction pipe 55 extending to pass above the tank 54A and the low-pressure fuel filter 59, then, into the low-pressure fuel pump 23. The low-pressure fuel discharged from the fuel pump 23 is sucked into the electric motor-driven fuel pump 19 by way of the suction port 15 and the suction opening 24. The fuel discharged from the pump 19 is then supplied to the delivery pipe 64 in the same manner as in the first example (FIGS. 1 and 3) and is injected from the injectors 65 into the engine 63. The effects and others in the second example (FIGS. 1 and 4) are similar to those in the first example (FIGS. 1 and 3).

Figure 2:
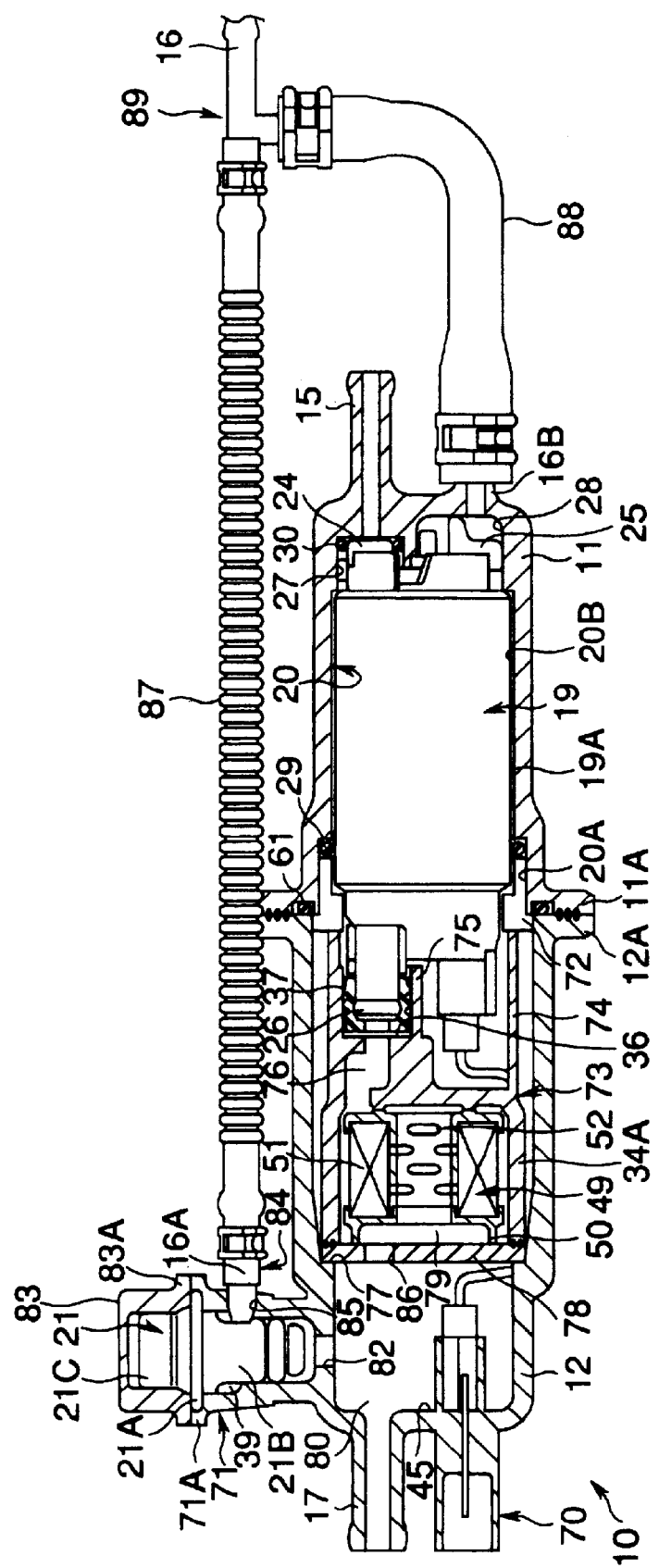
FIG. 2 is a partially sectional view of a pump device in a second embodiment according to the present invention.

Next, explanation is made on a fuel supply apparatus in a second embodiment according to the present invention. FIG. 2 is a partially sectional view of a pump device of the fuel supply apparatus in the second embodiment. Like elements in the second embodiment corresponding to those in the first embodiment are indicated by like numerals.

The second embodiment differs from the first embodiment in the following arrangements. The electric motor-driven fuel pump 19 in the first embodiment is arranged in parallel with the fuel filter 49, while an electric motor-driven fuel pump 19 in the second embodiment is arranged in series with the fuel filter 49. The excess fuel and others discharged form the pressure regulator 21 in the first embodiment is allowed to flow together with the excess fuel discharged from the pump 19 in the housing to return to the tank 54 by way of the return port 16. In the second embodiment, on the other hand, the excess fuel and others discharged from a pressure regulator 21 is discharged via a first return port 16A, while the excess fuel discharged from the pump 19 is discharged via a second return port 16B.

Specifically, a first case 11 constituting a housing of a pump device 10 in the second embodiment is integrally provided with a suction port 15 and a second return port 16B, both the ports being formed extending longitudinally (rightwards in FIG. 2) from an end of the case 11. A second case 12 is integrally provided with a discharge port 17 and a plug-in connector 70 for a power source, both of the port 17 and the connector 70 being formed extending longitudinally (leftwards in FIG. 2) from an end of the case 12. At the end side of the second case 12, a cylindrically protruding portion 71 for supporting the pressure regulator 21 is integrally formed protruding sideways (i.e., perpendicularly to the longitudinal direction of the case 12). The first case 1 is formed with a pump mounting hole 20 for holding the fuel pump 19. The configuration of the hole 20 is similar to that in the first embodiment except for the absence of the communication hole 38.

The electric motor-driven fuel pump 19 is held in the pump mounting hole 20 in the same manner as in the first embodiment. An annular stepped spacer 72 is inserted between a large-diameter hole section 20A of the pump mounting hole 20 and a large-diameter portion 19A of the pump 19. A flange 12A of the substantially cup-shaped second case 12 is brought in contact with a flange 11A of the first case 11 with an O-ring 61 mounted in an annular groove formed in a contact surface of the flange 11A. The O-ring 61 provides a seal between the flanges 11A and 12A that are connected by welding, bolts and nuts, or the like. An outer peripheral shoulder of the spacer 72 is kept in contact with an inner shoulder portion provided between the first and second cases 11 and 12 (due to the inner diameter of the first case 11 smaller than that of the second case 12).

The second case 12 is formed with an inner peripheral shoulder 77 which is brought into contact with a peripheral portion of a surface of a support plate 78. The other surface (a right surface in FIG. 2) of the support plate 78 contacts with an end of a lengthwise holder 73. This holder 73 is constructed of a cup-shaped portion 34A formed in a base side (a left side in FIG. 2) of the holder 73 and a ring-shaped portion 74 formed integrally with and adjacent to the cup-shaped portion 34A. An open end (a right end in FIG. 2) of the ring-shaped portion 74 is in contact with an end face of the spacer 72. A small protruding portion 75 is integrally formed with the ring-shaped portion 74 in the inner edge thereof. The small protruding portion 75 has a hollowed portion 36 for receiving a discharge outlet portion 26 formed projecting from the fuel pump 19. A cup-shaped support member 37 is provided between the discharge outlet portion 26 and the hollowed portion 36. The discharge outlet portion 26 communicates with the inside peripheral portion in the cup-shaped portion 34A by way of a communication hole of the support member 37 and a communication path 76 of the lengthwise holder 73.

The supporting member 50 of the fuel filter 49 is set inside the cup-shaped portion 34A of the holder 73. The supporting member 50 is formed with a plurality of through holes 52 in the inner peripheral wall of a filter mounting part and is provided with a cylindrical filter 51 set in the filter mounting part. The outer surface of the filter 51 communicates with the discharge outlet portion 26 through the communication path 76, while the inner surface of the filter 50 communicates with the discharge port 17 through the through holes 52, a space 79 provided between a support plate 78 and the fuel filter 49, a communication hole 86 of the support plate 78, and a space 80 provided between the support plate 78 and the inner bottom face 45 of the second case 12.

The space 80 communicates with the inside of the cylindrically protruding portion 71 through a communication hole 82. The protruding portion 71 is formed with a flange 71A in an end (an upper end in FIG. 2), an engagement hole and a widened section in the interior, and an annular groove in the inner periphery of the flange 71A, as shown in FIG. 2. The pressure regulator 21 is set in the protruding portion 71 with a small-diameter portion 21B inserted in the engagement hole and a flange 21A engaged in the grooved portion of the flange 71A. The engagement hole of the protruding portion 71 is sealed with respect to the small-diameter portion 21B of the pressure regulator 21. A large-diameter portion 21C of the regulator 21 is covered with a cup-shaped cap 83 having a flange 83A brought into contact and connected with the flange 71A.

The widened section of the protruding portion 71 and the outer surface of the regulator 21 provide a space 39 therebetween. An unillustrated outlet of the regulator 21 faces the space 39. The protruding portion 71 is formed with an engagement hole 85 in the side wall thereof. A hollow connector 84 is fixedly engaged in the engagement hole 85. This connector 84 is arranged protruding sideways from the protruding portion 71 in the same direction as the protruding direction of the suction port 15 and the second return port 16B. An inner end (a left end in FIG. 2) of the connector 84 opens into the space 39, while an outer end (a right end in FIG. 2) of the same configures the first return port 16A. This first return port 16A is connected to a first port of a trifurcated connector 89 through a connection pipe 87. The second return port 16B is connected to a second port of the trifurcated connector 89 through a connection pipe 88. The connector 89 also includes a main return port 16. Other structures in the second embodiment are substantially the same as those in the first embodiment.

Next, explanation is made on the case where the pump device 10 in the second embodiment is applied to the automobile of the first example (FIG. 3). Upon actuation of the pump device 10, the electric motor-driven fuel pump 19 is operated to suck the fuel from the fuel tank 54 through the fuel filter 59 for low-pressure fuel, the suction port 15, and the suction opening 24 of the pump 19. The fuel discharged from the pump 19 flows through the discharge outlet portion 26, the communication path 76, the fuel filter 49, the space 79, the communication hole 86, the space 80, the discharge port 17, and the discharge pipe 57, and thus the fuel is supplied to the delivery pipe 64. The fuel is then injected from injectors 65 connected with the delivery pipe 64 into the engine 63. Excess high-pressure fuel and fuel vapor are allowed to flow through the space 80, the communication hole 82, the inlet and the outlet of the pressure regulator 21, the space 39, the first return port 16A, the connection pipe 87, the trifurcated connector 89, the main return port 16, and the return pipe 56, in turn, into the fuel tank 54. On the other hand, excess low-pressure fuel is allowed to flow from the vapor discharge opening 25 of the pump 19, passing through a recessed portion 28, the second return port 16B, the connection pipe 88, and the main return port 16 of the trifurcated connector 89, to the return pipe 56, thus returning to the fuel tank 54.

Alternatively, the case where the pump device 10 in the second embodiment is applied to the automobile of the second example (FIG. 4) is described below. Upon actuation of the fuel pump 23 for low-pressure fuel and the pump device 10, the fuel pump 23 is operated to suck the fuel from the tank 54 through the fuel filter 59 for low-pressure fuel and the fuel pump 19 is operated to suck the low-pressure fuel discharged from the low-pressure fuel pump 23 through the suction port 15 and the suction opening 24. The fuel discharged from the fuel pump 19 is allowed to flow through the discharge outlet portion 26, the communication path 76, the fuel filter 49, the space 79, the communication hole 86, the space 80, the discharge port 17, the discharge pipe 57, and the fuel is supplied to the delivery pipe 64. The fuel is then injected from the injector 65 into the engine 63. The effects and others in the second example (FIGS. 2 and 4) are similar to those in the first example (FIGS. 2 and 3).

As mentioned above, the electric motor-driven fuel pump 19 (in particular, a high-pressure fuel pump), the fuel filter 49, the pressure regulator 21 are contained in an integral housing constructed of the cases 11 and 12, thus forming an integrally constructed pump device 10. The suction port 15 of the pump device 10 communicates with the suction opening 24 of the fuel pump 19. The discharge outlet portion 26 of the pump 19 communicates with the discharge port 17 of the pump device 10 through the fuel filter 49. The discharge port 17 of the pump device 10 communicates with the inlet of the pressure regulator 21. The outlet of the pressure regulator 21 communicates with the return port 16 of the pump device 10. Accordingly, the installation of the pump device 10 in automobiles needs no labors or troubles of connecting the electric motor-driven fuel pump 19, the fuel filter 49, and the pressure regulator 21 with pipes. The fuel pump 19, the fuel filter 49, and the pressure regulator 21 also require no individual leakage-preventing measures. Thus, the pump device 10, or the fuel supply apparatus in the above embodiments according to the present invention, can achieve cost-reduction.

The fuel supply apparatus according to the present invention can use any fuel tanks without restriction to size and shape. It is suitable for engines of a multi-point injection system (MPI) which use fuel tanks of many sizes and shapes.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A fuel supply apparatus for supplying fuel from a fuel tank to an engine by using a fuel pump, the apparatus being provided outside the fuel tank and including a pump device including:
    a fuel pump;
    a fuel filter;
    a pressure regulator;
    a housing for containing the fuel pump, the fuel filter, and the pressure iregulator, the housing being sealed;
    the housing including:
        a suction port and a return port, each connected to the fuel tank;
        a discharge port connected to the engine;
        a suction opening communication path for communicating the suction port to a suction opening of the fuel pump;
        a filter communication path for communicating a discharge outlet portion of the fuel pump to an entrance of the fuel filter;
        a discharge communication path for communicating an exit of the fuel filter to the discharge port; and
        a pressure regulator communication path for communicating the exit of the fuel filter to the pressure regulator,
    wherein when the fuel discharged from the fuel pump is supplied through the discharge port of the pump into the supply pipe, excess high-pressure fuel is returned to the fuel tank through the inlet and the outlet of the regulator and the return port, while excess low-pressure fuel is returned to the fuel tank through the vapor discharge opening of the fuel pump and the return port.

2. The fuel supply apparatus according to claim 1, wherein the fuel pump has a large-diameter portion which is supported by an O-ring in a medium-diameter hole formed in the housing.

3. The fuel supply apparatus according to claim 1, wherein the housing is constructed of a first housing member and a second housing member, the second housing member including a filter holding member for holding therein the fuel filter.

4. The fuel supply apparatus according to claim 3, wherein the filter holding member is supported by an O-ring with respect to the first housing member.

5. The fuel supply apparatus according to claim 3, wherein the fuel filter has a hollow cylindrical shape with an outer peripheral portion in which the entrance is formed and an inner peripheral portion in which the exit is formed.

6. The fuel supply apparatus according to claim 1, wherein the suction port, the discharge port, and the return port of the pump device is fixedly provided in the housing, and the return port communicates with a vapor discharge opening of the fuel pump.

7. The fuel supply apparatus according to claim 1, wherein the return port includes a first return port and a second return port both fixed to the housing, and a main return port connected to the fuel tank, the first return port communicates with an outlet of the pressure regulator, while the second return port communicates with a vapor discharge opening of the fuel pump, and the first and second return ports individually communicate with the main return port through respective connection pipes.

8. The fuel supply apparatus according to claim 7, wherein when the fuel discharged from the fuel pump is supplied through the discharge port of the pump into the supply pipe, the excess fuel discharged from the regulator is returned to the fuel tank through the inlet and the outlet of the regulator, the first return port, one of the connection pipes, and the main return port, while the excess fuel discharged from the fuel pump is returned to the fuel tank through the vapor discharge opening, the second return port, the other of the connection pipes, and the main return port.

9. The fuel supply apparatus according to claim 1 further including a low-pressure fuel pump, wherein the suction port of the pump device communicates with a discharge port of the low-pressure fuel pump.

10. The fuel supply apparatus according to claim 1, wherein the fuel pump includes an electric motor-driven pump.

11. The fuel supply apparatus according to claim 1, wherein the fuel pump and the fuel filter are arranged in parallel with each other in the housing.

12. The fuel supply apparatus according to claim 1, wherein the fuel pump and the fuel filter are arranged in series in the housing.

13. The fuel supply apparatus according to claim 1, wherein upon actuation of the pump device, the fuel pump is operated to suck fuel from the fuel tank through a fuel suction pipe connecting the fuel tank with the suction port of the pump device, the suction port, and the suction opening of the fuel pump, and to discharge the fuel to the engine through the discharge outlet portion, the fuel filter, the discharge port, and a fuel supplying pipe connecting the discharge port of the pump device with the engine.

* * * * *